US012734506B2

(12) United States Patent
Hommeltoft et al.

(10) Patent No.: US 12,734,506 B2
(45) **Date of Patent: *Sep. 15, 2026**

(54) CATALYST SELECTION FOR IMPROVED LIPID FEEDSTOCK CONVERSION

(71) Applicant: CHEVRON U.S.A. INC., San Ramon, CA (US)

(72) Inventors: Sven Ivar Hommeltoft, Pleasant Hill, CA (US); Shuwu Yang, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/351,030

(22) Filed: Oct. 6, 2025

(65) Prior Publication Data

US 2026/0027555 A1 Jan. 29, 2026

Related U.S. Application Data

(63) Continuation-in-part of application No. 19/022,557, filed on Jan. 15, 2025, now Pat. No. 12,434,224.

(Continued)

(51) Int. Cl.
*B01J 23/02* (2006.01)
*B01J 21/04* (2006.01)

(Continued)

(52) U.S. Cl.
CPC ............... *B01J 23/02* (2013.01); *B01J 21/04* (2013.01); *B01J 35/40* (2024.01); *C10G 67/02* (2013.01); *C10L 1/04* (2013.01)

(58) Field of Classification Search
CPC . B01J 23/02; B01J 35/394; B01J 35/40; B01J 37/0201; B01J 37/0236; B01J 37/08;

(Continued)

(56) References Cited

U.S. PATENT DOCUMENTS 2,664,336 A 12/1953 Cornell
3,433,733 A 3/1969 Bunn, Jr. et al.

(Continued)

FOREIGN PATENT DOCUMENTS

CN 101314748 12/2008
CN 102786966 11/2012

(Continued)

OTHER PUBLICATIONS

Chen et al., "Catalytic fast pyrolysis of biomass: Selective deoxygenation to balance the quality and yield of bio-oil," Bioresource Technol., 273, pp. 153-158, 2019.

(Continued)

*Primary Examiner* — Brian A McCaig
(74) *Attorney, Agent, or Firm* — Sheppard, Mullin, Richter & Hampton LLP; Jaime D. Choi

(57) ABSTRACT

A reactor system includes a reactor that treats a lipid feedstock using a metal oxide catalyst to produce a treated stream comprising a bio-oil. The metal oxide catalyst includes catalyst particles having a diameter of 0.01 to 0.5 mm. The metal oxide catalyst can comprise calcium on alumina. The bio-oil has an increased proportion of transportation fuels relative to other techniques for processing lipid feedstocks.

18 Claims, 3 Drawing Sheets

Related U.S. Application Data

(60) Provisional application No. 63/621,557, filed on Jan. 16, 2024.

(51) Int. Cl.
*B01J 35/40* (2024.01)
*C10G 67/02* (2006.01)
*C10L 1/04* (2006.01)

(58) Field of Classification Search
CPC .. C10G 3/48; C10G 65/12; C10G 2300/1011; C10G 2400/08
See application file for complete search history.

(56) References Cited

U.S. PATENT DOCUMENTS

| | | | |
|---|---|---|---|
| 3,784,463 | A | 1/1974 | Reynolds et al. |
| 3,894,936 | A | 7/1975 | Hartley |
| 4,007,131 | A | 2/1977 | Gilespie |
| 4,645,585 | A | 2/1987 | White |
| 4,880,574 | A | 11/1989 | Welsh |
| 5,145,490 | A | 9/1992 | Sadowski |
| 5,145,649 | A | 9/1992 | Iizuka et al. |
| 6,187,465 | B1 | 2/2001 | Galloway |
| 7,998,339 | B2 | 8/2011 | Myllyoja et al. |
| 8,350,102 | B2 | 1/2013 | Roberts, IV et al. |
| 8,354,065 | B1 | 1/2013 | Sexton et al. |
| 9,580,657 | B2 | 2/2017 | Heydenrych et al. |
| 9,903,584 | B2 | 2/2018 | Fan et al. |
| 10,190,059 | B2 | 1/2019 | Chapus et al. |
| 10,479,943 | B1 | 11/2019 | Liu et al. |
| 10,947,458 | B1 | 3/2021 | Tengfei et al. |
| 11,479,725 | B2 | 10/2022 | Amblard et al. |
| 11,555,153 | B1 | 1/2023 | Hommeltoft |
| 11,912,947 | B1 | 2/2024 | Hommeltoft |
| 12,139,673 | B2 | 11/2024 | Andersson et al. |
| 12,241,421 | B1 | 3/2025 | Minelli |
| 12,319,878 | B2 | 6/2025 | Hommeltoft |
| 12,319,881 | B1 | 6/2025 | Han et al. |
| 12,421,460 | B2 | 9/2025 | Hommeltoft |
| 12,434,224 | B2 | 10/2025 | Hommeltoft |
| 2007/0161832 | A1 | 7/2007 | Myllyoja et al. |
| 2008/0053870 | A1 | 3/2008 | Marker |
| 2009/0000185 | A1 | 1/2009 | Aulich et al. |
| 2009/0158637 | A1 | 6/2009 | McCall et al. |
| 2009/0300970 | A1 | 12/2009 | Perego |
| 2010/0043278 | A1 | 2/2010 | Brevoord |
| 2010/0163395 | A1 | 7/2010 | Henrich |
| 2011/0021857 | A1 | 1/2011 | Cao |
| 2011/0054230 | A1 | 3/2011 | Cole et al. |
| 2011/0056869 | A1 | 3/2011 | Novak et al. |
| 2011/0196113 | A1 | 8/2011 | Nesterenko |
| 2011/0237853 | A1 | 9/2011 | Hamamatsu et al. |
| 2012/0137572 | A1 | 6/2012 | Bartek et al. |
| 2012/0160741 | A1 | 6/2012 | Gong et al. |
| 2012/0203042 | A1 | 8/2012 | Huber et al. |
| 2012/0238787 | A1 | 9/2012 | Gruber et al. |
| 2012/0244585 | A1 | 9/2012 | Kale et al. |
| 2012/0251424 | A1 | 10/2012 | Havlik et al. |
| 2012/0258021 | A1 | 10/2012 | Badger |
| 2012/0316093 | A1 | 12/2012 | Zhan et al. |
| 2013/0006028 | A1 | 1/2013 | Chaogang et al. |
| 2013/0025187 | A1 | 1/2013 | Kocal et al. |
| 2013/0338409 | A1 | 12/2013 | Trewalla et al. |
| 2013/0338418 | A1 | 12/2013 | Xu |
| 2013/0343958 | A1 | 12/2013 | Swann |
| 2014/0012025 | A1 | 1/2014 | Sohling et al. |
| 2014/0109464 | A1 | 4/2014 | Powell et al. |
| 2014/0123973 | A1 | 5/2014 | North |
| 2014/0148609 | A1 | 5/2014 | Roussis et al. |
| 2014/0163285 | A1 | 6/2014 | Buchanan et al. |
| 2014/0171700 | A1 | 6/2014 | Roberts |
| 2015/0018581 | A1 | 1/2015 | Kettunen |
| 2015/0051428 | A1 | 2/2015 | Dayton |
| 2015/0087861 | A1 | 3/2015 | Devaux et al. |
| 2015/0141703 | A1 | 5/2015 | Dubois |
| 2015/0259202 | A1 | 9/2015 | Dybkj |
| 2017/0183581 | A1 | 6/2017 | Ladkat |
| 2018/0170824 | A1 | 6/2018 | Sreekumar |
| 2018/0258349 | A1 | 9/2018 | Heydenrych |
| 2019/0093035 | A1 | 3/2019 | Malatak |
| 2019/0185759 | A1 | 6/2019 | Kanervo et al. |
| 2019/0299195 | A1 | 10/2019 | Nakazawa |
| 2019/0338219 | A1 | 11/2019 | White |
| 2020/0017772 | A1 | 1/2020 | Ramamurthy |
| 2021/0179952 | A1 | 6/2021 | Tsuto et al. |
| 2021/0380885 | A1 | 12/2021 | Mills |
| 2022/0041938 | A1 | 2/2022 | Hommeltoft |
| 2022/0048833 | A1 | 2/2022 | Drobyshev |
| 2022/0049172 | A1 | 2/2022 | Tiitta et al. |
| 2022/0119328 | A1 | 4/2022 | Schroer |
| 2022/0145199 | A1 | 5/2022 | Kuo |
| 2022/0403252 | A1 | 12/2022 | Vilja et al. |
| 2023/0098592 | A1 | 3/2023 | Novak |
| 2023/0234843 | A1 | 7/2023 | Hobby |
| 2023/0357106 | A1 | 11/2023 | Missalla et al. |
| 2024/0018419 | A1 | 1/2024 | Huizenga |
| 2024/0157320 | A1 | 5/2024 | Song et al. |
| 2024/0157347 | A1 | 5/2024 | Hommeltoft |
| 2024/0218261 | A1 | 7/2024 | Hommeltoft |
| 2024/0253028 | A1 | 8/2024 | Zhang |
| 2024/0425764 | A1 | 12/2024 | Hommeltoft |
| 2025/0027000 | A1 | 1/2025 | Hommeltoft |
| 2025/0333656 | A1 | 10/2025 | Hommeltoft |
| 2026/0008023 | A1 | 1/2026 | Hommeltoft |
| 2026/0015547 | A1 | 1/2026 | Hommeltoft |

FOREIGN PATENT DOCUMENTS

| | | | |
|---|---|---|---|
| EP | 2141217 | B1 | 3/2015 |
| EP | 4372069 | A1 | 5/2024 |
| FI | 20205954 | A1 | 3/2022 |
| FI | 20225933 | A1 | 4/2024 |
| FR | 2991596 | A1 | 12/2013 |
| WO | 2008/152199 | | 12/2008 |
| WO | 2009/130392 | | 10/2009 |
| WO | 2010071677 | | 6/2010 |
| WO | 2014/089131 | | 6/2014 |
| WO | 2015/148412 | | 10/2015 |
| WO | 2023/066738 | | 4/2023 |
| WO | 2023088772 | | 5/2023 |
| WO | 2022221840 | | 1/2024 |
| WO | 2024006239 | | 1/2024 |

OTHER PUBLICATIONS

Chen et al., “Recent developments in ignocellulosic biomass catalytic fast pyrolysis: Strategies for the optimization of bio-oil quality and yield,” Fuel Process Technol., 196, 106180, 2019.

Han et al., Advancing the application of bio-oils by co-processing with petroleum intermediates: A review, Energy Conversion and Management, 2021.

Liang et al., “Catalytic fast pyrolysis of lignocellulosic biomass: Critical role of zeolite catalysts,” Renew. Sust. Energ. Rev., 139, 110707, 2021.

Zhang et al., “Superheated steam as carrier gas and the sole heat source to enhance biomass torrefaction,” Bioresource Technology, 2021.

Zhou et al., “Catalytic conversion of lignocellulosic biomass to fine chemicals and fuels,” Chem. Soc. Rev. 40, pp. 5588-5617, 2011.

Gibon et al., “Palm oil refining,” Eur. J. Lipid. Sci. Technol. 109 (2007), 315-335.

Glowka et al., “Sustainable aviation fuel—Comprehensive study on highly selective isomerization route towards HEFA based bioadditives,” Renewable Energy 220 (2024), 9 pages.

Huber et al., “Synthesis of Transportation Fuels from Biomass: Chemistry, Catalysts, and Engineering,” Chem. Rev. (2006), 106, 4044-4098.

Mu et al., “Optimum design of radial flow moving-bed reactors based on a mathematical hydrodynamic model,” Chemical Engineering and Processing 42 (2003), pp. 409-417.

(56) References Cited

OTHER PUBLICATIONS

Renz, "Ketonization of Carboxylic Acids by Decarbooxylation: Mechanism and Scope," Eur. J. Org. Chem. 2005, 979-988.
Shirzad et al., "Moving Bed Reactors: Challenges and Progress of Experimental and Theoretical Studies in a Century of Research," Ind. Eng. Chem. Res. 58 (2019), pp. 9179-9198.
Zabeti et al., "Biodiesel production using alumina-supported calcium-oxide: An optimization study," Fuel Processing Technology 91 (2010) 243-248.
Li et al., "Applications of calcium oxide-based catalyst in biomass pyrolysis/gasification—A review," Journal of Cleaner Production, 291, pp. 1-12, 2021.
Thangadurai et al., "Acidity and basicity of metal oxide based catalysts in catalytic cracking of vegetable oil," Brazilian Journal of Chemical Engineering, 38:1-20, 2021.
ASTM International "D7566-24c Standard Specification for Aviation Turbine Fuel Containing Synthesized Hydrocarbons" Last updated Oct. 2024. pp. 1-41.
Mansir et al., "Catalytically active metal oxides studies for the conversion technology of carboxylic acids and bioresource based fatty acids to ketones: A review," Bioresource Technology Reports 17 (2022) 100988.

CATALYST SELECTION FOR IMPROVED LIPID FEEDSTOCK CONVERSION

CROSS-REFERENCE TO RELATED APPLICATIONS

This application is a continuation-in-part of U.S. patent application Ser. No. 19/022,557, filed Jan. 15, 2025 and entitled "Catalyst Selection for Improved Lipid Feedstock Conversion," which claims the benefit of U.S. Provisional Patent Application No. 63/621,557, filed Jan. 16, 2024 and entitled "Catalyst Selection for Improved Lipid Feedstock Conversion," the entire contents of each of which are incorporated by reference herein.

TECHNICAL FIELD

Embodiments of the technology relate generally to upgrading compositions that may be used as renewable feedstocks for refinery processing and selecting catalyst properties to improve such upgrading.

BACKGROUND

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, organic chlorine compounds, phospholipids and other phosphorus compounds, metals and metal compounds, and residual soaps, which are, for example, deleterious to converting catalysts.

Despite the ongoing research and development in the processing of renewable feedstocks and manufacture of fuels, there is still a need to provide an improved process for purifying renewable feedstock to provide purified feedstock, which is suitable for converting to valuable chemicals, such as hydrocarbons suitable as fuels or fuel blending components. In particular, existing reactor systems and processes used to process renewable feedstocks typically produce an intermediate product containing products over a wide boiling range from light naphtha to components boiling well above 350° C. While components with a high boiling point can be useful in certain applications, these components typically are less valuable in the production of renewable transportation fuels, such as renewable aviation fuel, renewable diesel fuel, and renewable gasoline, that boil in the range of 40° C. to 300° C. Therefore, there is a need for reactor systems and processes that can improve the processing of renewable feedstocks to result in products with increased components in the gasoline and jet fuel range.

SUMMARY

In one example embodiment, the present disclosure is generally directed to a process for treating a lipid feedstock that produces a treated stream having a greater yield of transportation fuels having a boiling point range of 40° C. to 300° C. The process can comprise: (a) providing the lipid feedstock to a reactor such that the lipid feedstock reacts with at least one bed of catalyst particles producing the treated stream, wherein the catalyst particles have a diameter of 0.01 to 0.5 mm and comprise a metal oxide on an oxide support; and (b) fractionating the treated stream to obtain a gaseous fraction and a liquid fraction, the liquid fraction comprising a bio-oil having a lower content of oxygen and impurities than the lipid feedstock.

In another example embodiment, the present disclosure is generally directed to a reactor system that treats a lipid feedstock and produces a treated stream having a greater yield of transportation fuels having a boiling point range of 40° C. to 300° C. The reactor system can comprise: (a) a reactor configured to contain at least one bed of catalyst particles, wherein the catalyst particles have a diameter of 0.01 to 0.5 mm and comprise a metal oxide on an oxide support; (b) a lipid feedstock inlet for feeding the lipid feedstock to the reactor wherein the lipid feedstock reacts with the catalyst particles and the treated stream is produced; and (c) a separator for receiving the treated stream from the reactor and fractionating the treated stream to obtain a gaseous fraction and a liquid fraction, the liquid fraction comprising a bio-oil having a lower content of oxygen and impurities than the lipid feedstock.

In one example embodiment, the present disclosure is generally directed to a method of processing a lipid feedstock. The method can comprise feeding a lipid feedstock to a reactor comprising at least one bed of catalyst particles, wherein the catalyst particles comprise a metal oxide on an oxide support and promote combined ketonization and pyrolysis of the lipid feedstock to produce a treated stream; and fractionating the treated stream to obtain a gaseous fraction and a liquid fraction, the liquid fraction comprising a bio-oil having a lower content of oxygen and impurities than the lipid feedstock.

In another example embodiment, the present disclosure is generally directed to a reactor system for processing a lipid feedstock. The reactor system can comprise a reactor containing at least one bed of catalyst particles, wherein the catalyst particles comprise a metal oxide on an oxide support and promote combined ketonization and pyrolysis of the lipid feedstock to produce a treated stream; a lipid feedstock inlet for feeding the lipid feedstock to the reactor; and a separator for receiving the treated stream from the reactor and fractionating the treated stream to obtain a gaseous fraction and a liquid fraction, the liquid fraction comprising a bio-oil having a lower content of oxygen and impurities than the lipid feedstock.

In some embodiments, the catalyst particles have a diameter of 0.01 mm to 5 mm.

In some embodiments, the catalyst particles have a diameter of 0.5 mm to 5 mm.

In some embodiments, the metal of the metal oxide is selected from Na, K, Cs, Ba, Mg, Ca, Sr, Cr, Mo, Mn, Fe, Co, Ni, Cu, Zn, Al, Y, Zr, Ti, Ce, and La, or a mixture thereof.

In some embodiments, the metal of the metal oxide is selected from: Na, K, and Cs; Ba, Mg, Ca, and Sr; and Ce and La. In some embodiments, the metal of the metal oxide is selected from Na, K, and Cs. In some embodiments, the metal of the metal oxide is selected from Ba, Mg, Ca, and Sr. In some embodiments, the metal of the metal oxide is selected from Ce and La.

In some embodiments, the metal of the metal oxide is selected from a mixture of K and Ca; a mixture of Ca and Mg; a mixture of Ce and Mg; a mixture of Ca and La; a mixture of K and Ce; a mixture of Ca and Ce; a mixture of Mg, Ca, and Ce; and a mixture of K, Ca, and Ce.

In some embodiments, the oxide support is selected from alumina, silica, silica-alumina, titania, and zirconia, or a mixture thereof.

In some embodiments, the oxide support is selected from silica-alumina, zeolite, alumina, magnesium oxide, zirconia oxide, and titanium oxide.

In some embodiments, the oxide support is silica-alumina. In some embodiments, the oxide support is a zeolite. In some embodiments, the oxide support is magnesium oxide. In some embodiments, the oxide support is zirconia oxide. In some embodiments, the oxide support is titanium oxide.

In some embodiments, the oxide support is alumina.

In some embodiments, the jet fuel A fraction comprises 30 to 34 wt % of the bio-oil.

In some embodiments, a fraction having a boiling point range of 75 to 200° C. comprises 32 to 35 wt % of the bio-oil.

In some embodiments, the method further comprises subjecting the bio-oil to a catalytic hydroprocessing step to provide a hydroprocessed product.

In some embodiments, the bio-oil has an oxygen content of 10% to 40% of the oxygen content of the lipid feedstock.

The foregoing embodiments are non-limiting examples and other aspects and embodiments will be described herein. The foregoing summary is provided to introduce various concepts in a simplified form that are further described below in the detailed description. This summary is not intended to identify required or essential features of the claimed subject matter nor is the summary intended to limit the scope of the claimed subject matter.

BRIEF DESCRIPTION OF THE DRAWINGS

The accompanying drawings illustrate only example embodiments relating to processing a lipid feedstock and therefore are not to be considered limiting of the scope of this disclosure. The principles illustrated in the example embodiments of the drawings can be applied to alternate methods and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

The example embodiments discussed herein are directed to apparatus and methods for processing a lipid feedstock. The example apparatus and methods described herein are particularly beneficial in the oil and gas industry where lipid feedstocks can be used in the production of transportation fuels. As will be described further below, the apparatus and methods described herein utilize a reactor system comprising one or more reactors for treating lipid feedstocks to produce a bio-oil renewable feedstock comprising improved amounts of transportation fuels having a boiling point range of 40° C. to 300° C.

As described above, one of the challenges associated with the use of renewable lipid feedstocks is that the processing of such feedstocks provides an intermediate product comprising components that have a wide boiling range from light naphtha to components that boil well above 350° C. Given the value of processing renewable lipid feedstocks into transportation fuels that boil in the range of 40° C. to 300° C., processing techniques that improve the yield of transportation fuels would be beneficial. In particular, processing techniques that improve the intermediate product by shifting the distribution of the product toward a higher yield of transportation fuels relative to other components would be beneficial.

Figure 1:
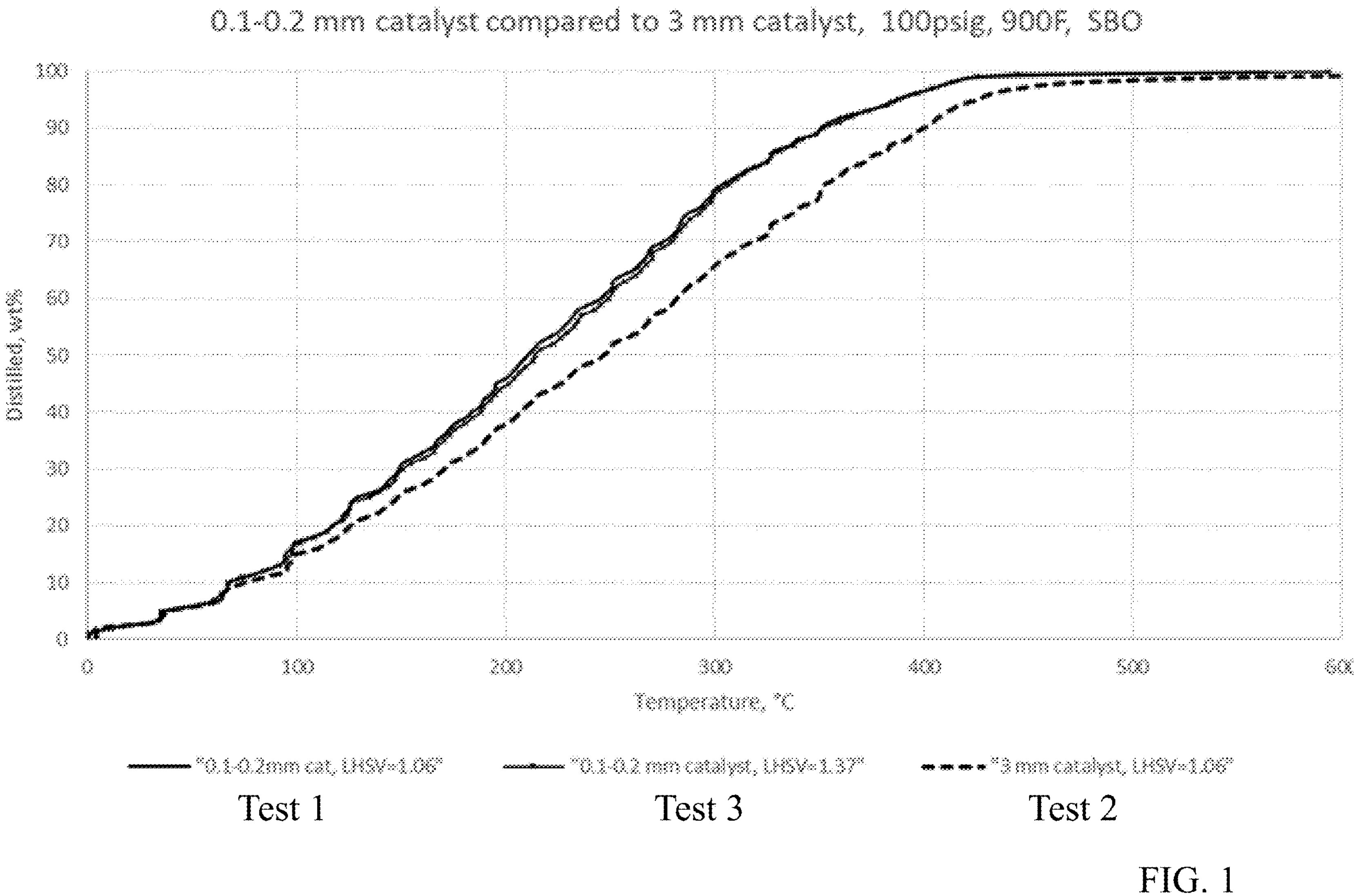
FIG. 1 is a graph of data illustrating improved yields of transportation fuels resulting from treatment of a lipid feedstock in accordance with the example embodiments of the disclosure.
Figure 2:
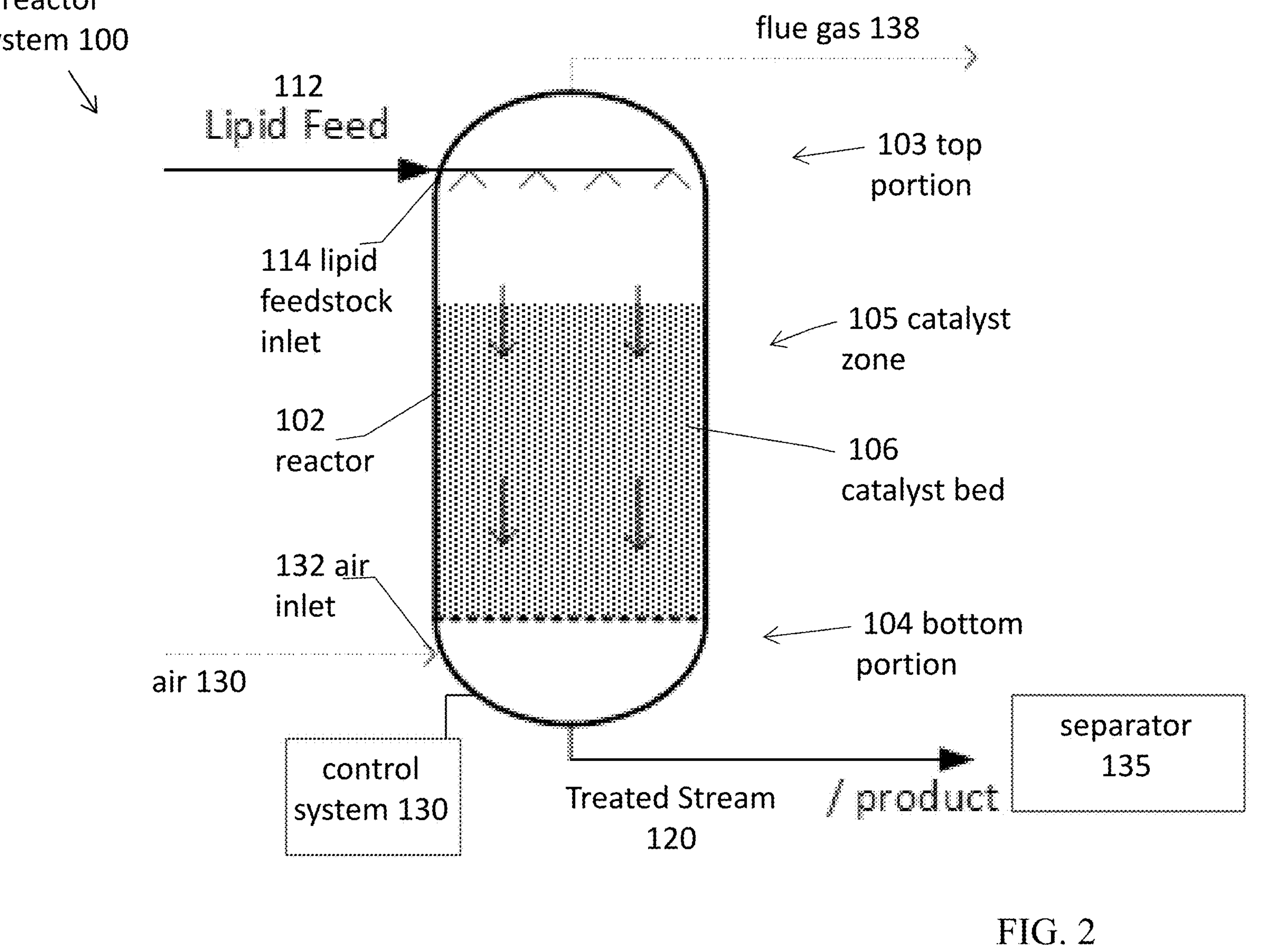
FIG. 2 illustrates a reactor system operating in accordance with an example embodiment of the disclosure.
Figure 3:
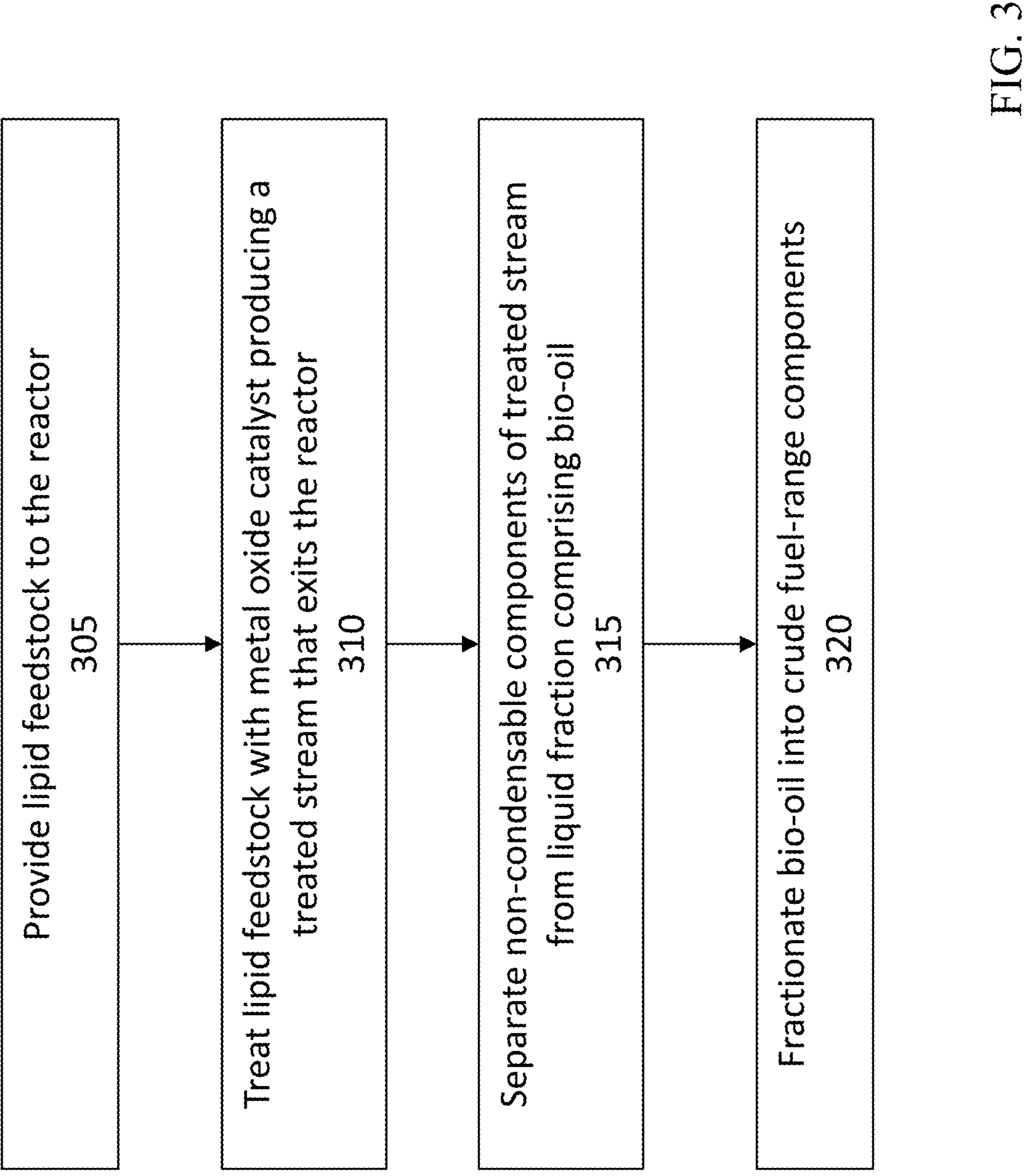
FIG. 3 illustrates a method of operating a reactor for processing a lipid feedstock in accordance with an example embodiment of the disclosure.

As explained further below, the example embodiments described herein provide techniques for improving the yield of transportation fuels from the processing a renewable lipid feedstock. FIG. 1 is a graph of data illustrating improved yields of transportation fuels resulting from treatment of a lipid feedstock in accordance with the example embodiments of the disclosure. FIG. 2 illustrates a reactor system operating in accordance with an example embodiment of the disclosure. FIG. 3 illustrates a method of operating a reactor for processing a lipid feedstock in accordance with an example embodiment of the disclosure. Further details of these example embodiments will be elucidated in the descriptions that follow.

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Definitions

The term "lipid" is known in the art and refers to fatty acids and their derivatives. Accordingly, examples of lipids include fatty acids (both saturated and unsaturated); glycerides or glycerolipids, also referred to as acylglycerols (such as monoglycerides (monoacylgycerols), diglycerides (diacylglycerols), triglycerides (triacylglycerols, TAGs, or neutral fats); phosphoglycerides (glycerophospholipids); nonglycerides (sphingolipids, sterol lipids, including cholesterol and steroid hormones, prenol lipids including terpenoids, fatty alcohols, waxes, and polyketides); and complex lipid derivatives (sugar-linked lipids or glycolipids, and protein-linked lipids).

The term "fatty acid" refers to a monocarboxylic acid having an aliphatic chain containing 3 to 39 carbon atoms, more particularly 7 to 23 carbon atoms. The aliphatic chain may be linear or branched and may be saturated or unsaturated (e.g., contain one or more carbon-carbon double bonds).

The term "bio-oil" means a liquid product produced from biomass by a thermochemical process. Bio-oil may include bio-derived hydrocarbon fractions and oxygenated hydrocarbons such as carboxylic acids, alcohols, aldehydes, ketones, etc.

The term "pyrolysis" refers to the thermal decomposition of organic materials in an oxygen-lean atmosphere (i.e., significantly less oxygen than required for complete combustion). The term "ketopyrolysis" refers to a combined ketonization and pyrolysis process as described further below.

The term "hydroprocessing" generally encompasses all processes in which a hydrocarbon feedstock is reacted with hydrogen in the presence of a catalyst and under hydroprocessing conditions, typically, at elevated temperature and elevated pressure. Hydroprocessing includes, but is not limited to, processes such as hydrogenation, hydrodeoxygenation, hydrodesulfurization, hydrodenitrogenation, hydrodemetallization, hydrodearomatization, hydroisomerization, hydrodewaxing, hydrocracking and mild hydrocracking.

The term "transportation fuels" refer here to fractions or cuts or blends of hydrocarbons having distillation curves standardized for fuels, such as for diesel fuel (middle distillate from 160° C. to 380° C., according to EN 590), gasoline (40° C. to 210° C., according to EN 228), aviation fuel (160° C. to 300° C., according to ASTM D-1655 jet fuel), kerosene, naphtha, etc. Liquid fuels are hydrocarbons having distillation curves standardized for fuels, such as transportation fuels.

The term "ppm" means parts-per-million and is a weight relative parameter. A part-per-million is a microgram per gram, such that a component that is present at 10 ppm is present at 10 micrograms of the specific component per 1 gram of the aggregate mixture.

Lipid Feedstock

The lipid feedstocks described herein originate from a renewable or biological source or sources, and the lipid feedstocks are meant to include here feedstocks other than those obtained from mineral oil, shale oil, or coal.

The lipid feedstock may for example comprise 0 to 90 wt. % of free fatty acids, 5 to 100 wt. % fatty acid glycerol esters (e.g., mono-, di-, triglycerides) and 0 to 20 wt. % of one or more compounds selected from the list consisting of: fatty acid esters of the non-glycerol type, fatty amides, and fatty alcohols, where the renewable feedstock comprises more than 50 wt. % of free fatty acids and fatty acid glycerol esters such as 70 wt. % or more, for example 80 wt. % or more.

The lipid feedstock may originate for example from plants, animals, algae (algae oil, algae biomass, algae cultivation), fish and microbiological processes.

Examples of such feedstocks include feedstocks originating from low value renewable waste materials, side streams, by-products, refining waste and residues, sewage sludge, and any combinations thereof.

The lipid feedstock may be selected from the group consisting of acidulated soap-stocks, fatty acid distillates from physical refining of plant oils or animal fats, distillers corn oil (DCO) from ethanol production, waste cooking oils, lard, brown grease, yellow grease, trap grease, waste fats, low-grade oils, supercritical water liquefaction oils (SCWL oils), plant oils, animal fats and any combination thereof.

Such lipid feedstocks typically contain varying amounts of impurities, such as phosphorus, silicon, chloride, alkali metals, earth alkaline metals, other metals, etc.

The lipid feedstock may comprise at least 10 ppm (e.g., 10 to 100 ppm, 10 to 75 ppm, 10 to 50 ppm, 15 to 100 ppm, or 15 to 50 ppm) of chlorine, calculated as elemental chlorine (a Cl atom). Chlorine content can be determined using combustion ion chromatography (CIC). Combustion ion chromatography is a technique in which a sample is burned in oxygen-containing gas flow, the gas generated is absorbed in an adsorption solution and then, a halogen ion adsorbed in the adsorption solution is quantitatively analyzed by an ion chromatography method. The technique makes it possible to easily analyze a halogen component in ppm range which has been conventionally difficult.

Lipid feedstocks comprising one or more of alkali metals, alkaline earth metals, and/or other metals, such as iron and manganese, even in low amounts are often regarded as not suitable for catalytic treatment in refinery operations because each of the metals is an effective catalyst poison. The alkali metals, alkaline earth metals and other metals may typically comprise Na, K, Mg, Ca, Mn, Fe, or a combination thereof.

The lipid feedstock may comprise at least 1 ppm (e.g., 1 to 250 ppm, 1 to 100 ppm, 1 to 50 ppm, 1 to 25 ppm, 2 to 250 ppm, 2 to 100 ppm, or 2 to 25 ppm) of alkali metals, alkaline earth metals, metals of Groups VIIB and VIIIB, or combinations thereof, calculated as elemental metals, in total. Total metals content can be determined using AOCS Recommended Practice Ca 17-01.

Low value lipid feedstocks, such as various types of animal fats and waste oils, generally have a relatively high concentration of free fatty acids. One method of assessing the concentration of free fatty acids is to determine the total acid number (TAN) of the feedstock. The total acid number is the mass of potassium hydroxide (KOH) in milligrams that is required to neutralize one gram of the chemical substance being assessed.

The lipid feedstock may have an acid number of at least 5 mg KOH/g (e.g., 5 to 150 mg KOH/g, 10 to 150 mg KOH/g, 10 to 100 mg KOH/g, 10 to 50 mg KOH/g, from 10 to 25 mg KOH/g, or 10 to 20 mg KOH/g). Acid number can be determined using ASTM D664.

The lipid feedstock may be pretreated. Such pretreatments include, but are not limited to, degumming, neutralization, bleaching, deodorizing, or any combination thereof.

Treatment of the Lipid Feedstock

In order to provide renewable feedstocks suitable for refinery operations, the lipid feedstock is treated with a metal oxide catalyst on an oxide support under treating conditions to produce a treated stream, which is also referred to as an intermediate product within the process of producing transportation fuels. The treated stream comprises non-condensable components (e.g., carbon dioxide and volatile organic compounds) and a liquid fraction comprising a bio-oil. The bio-oil has a lower content of free fatty acids and impurities as compared to the renewable lipid feedstock that existed before treating with the catalyst. The obtained bio-oil is particularly suitable as a renewable feedstock for hydroprocessing in biofuel manufacture.

Without being bound by theory, the treating is believed to proceed by a thermochemical process which includes one of more of cracking, decarboxylation, decarboxylation-coupling, dehydration and/or deoxygenation reactions.

Suitable treating conditions may comprise one or more of the following: a temperature in a range of from 400° C. to 700° C. (e.g., 425° C. to 650° C., or 450° C. to 600° C.); a pressure in a range of from 0 to 1,450 psi (0 to 10 MPa) (e.g., 14 to 725 psi (0.1 to 5 MPa), or 14 to 145 psi (0.1 to 1 MPa); and a liquid hourly space velocity (LHSV) in a range of from 0.1 to 10 $h^{-1}$ (e.g., 0.2 to 5 $h^{-1}$, or 0.3 to 3 $h^{-1}$).

The reaction may be carried out in the presence of a carrier gas comprising hydrogen, nitrogen, carbon dioxide, $H_2O$ (water vapor) or C1-C4 hydrocarbons (e.g., methane, ethane, propane or mixtures thereof), preferably, $CO_2$ or $H_2O$. These gases may be admixed into the reaction mixture and/or may be formed in the course of the reaction. The carrier gas may be used to expel gaseous or volatile reaction products from the product mixture such as $H_2O$ or $CO_2$.

The reaction is carried out in the presence of a metal oxide catalyst on an oxide support. The metal of the metal oxide may be selected from Na, K, Mg, Ca, Sr, Cr, Mo, Mn, Fe, Co, Ni, Cu, Zn, Al, rare earth metals, or a mixture thereof. The oxide support may be selected from alumina, silica, silica-alumina, titania, zirconia, or a mixture thereof. In some aspects, the metal oxide catalyst comprises CaO, the oxide support being alumina.

In some examples, the metal of the metal oxide may be selected from Na, K, Cs, Ba, Mg, Ca, Sr, Cr, Mo, Mn, Fe, Co, Ni, Cu, Zn, Al, Y, Zr, Ti, Ce, and La, or mixtures thereof. In some examples, the metal of the metal oxide may be selected from an alkali metal (Group 1), an alkaline earth metals (Group 2), a rare earth metal, or a mixture thereof. In some examples, the metal of the metal oxide is selected from Na, K, and Cs. In some examples, the metal of the metal oxide is selected from Ba, Mg, Ca, and Sr. In some examples, wherein the metal of the metal oxide is selected from Ce and La.

In some examples, the metal of the metal oxide is a mixture of two or more metals. In some examples, the metal of the metal oxide is a mixture of two or more metals selected from Na, K, Cs, Ba, Mg, Ca, Sr, Cr, Mo, Mn, Fe, Co, Ni, Cu, Zn, Al, Y, Zr, Ti, Ce, and La. In some examples, the metal of the metal oxide is a mixture of two or more metals selected from K, Ca, Mg, Ce, and La. In some examples, the metal of the metal oxide is selected from: a mixture of K and Ca, a mixture of Ca and Mg, a mixture of Ce and Mg, a mixture of Ca and La, a mixture of K and Ce, a mixture of Ca and Ce, a mixture of Mg, Ca, and Ce, and a mixture of K, Ca, and Ce. It is contemplated that mixed metal oxide catalysts provide dual functions by promoting formation of ketones and by tuning the acidity of the catalyst in order to improve liquid yield.

In some examples, the oxide support is alumina. In some examples, the oxide support is magnesium oxide (MgO). In some examples, the oxide support is zirconia oxide ($ZrO_2$). In some examples, the oxide support is titanium oxide ($TiO_2$). In some examples, the oxide support is silica-alumina. In some examples, the oxide support is a zeolite.

In some examples, the metal oxide catalyst comprises oxides of Na, K, Cs, Ba, Mg, Ca, Sr, Cr, Mo, Mn, Fe, Co, Ni, Cu, Zn, Al, Y, Zr, Ti, Ce, La, or mixtures thereof, the oxide support being alumina. In some examples, the metal oxide catalyst comprises oxides of Na, K, Cs, Ba, Mg, Ca, Sr, Cr, Mo, Mn, Fe, Co, Ni, Cu, Zn, Al, Y, Zr, Ti, Ce, La, or mixtures thereof, the oxide support being zeolite. In some examples, the metal oxide catalyst comprises oxides of Na, K, Cs, Ba, Mg, Ca, Sr, Cr, Mo, Mn, Fe, Co, Ni, Cu, Zn, Al, Y, Zr, Ti, Ce, La, or mixtures thereof, the oxide support being alumina.

In an example embodiment, a calcium-promoted alumina catalyst is prepared. Alumina is wetted to incipient wetness with a calcium acetate solution containing 10 g $(CH_3CO_2)_2Ca$ dissolved in 50 mL water, dried in air at 120° C.-150° C., and calcined at 900° F. to give a calcium-promoted alumina catalyst. For higher calcium loadings repeated impregnation-drying-calcination cycles may be used.

Alternatively, higher calcium loadings in the catalyst particles may be accomplished in a single impregnation-drying-calcination cycle using calcium nitrate as the calcium source. Calcium nitrate is much more soluble in water than calcium acetate and it is therefore possible to make core concentrated solutions increasing the calcium uptake at incipient wetness. As an illustrative example: 54 g $Ca(NO_3)_2 \cdot 4H_2O$ dissolved in 25 ml water is used to impregnate 100 g alumina. The resulting catalyst is dried in an oven at 150° C. (1 hour or more) and calcined at 650° C. for 2 hours.

In one example embodiment, a catalyst comprising calcium oxide on an alumina support can have catalyst particles comprising 0.1 to 10 wt % of calcium. Such a catalyst shows improved yields of transportation fuels having a boiling point range of 40° C. to 300° C.

The catalyst particles can be shaped as spheres, spheroids, or granules. As described further below, in one example embodiment, the catalyst particles have a diameter in the range of 0.01 to 0.5 mm. In yet another embodiment, the catalyst particles have a diameter in the range of 0.10 to 0.50 mm, and yet more preferably a diameter in the range of 0.05 to 0.2 mm. As an example, the diameter of the catalyst particles can be an average diameter of the catalyst particles in the catalyst bed of the reactor. As another example, the diameter of the catalyst particles in the catalyst bed of the reactor can be expressed as having a D50 in the foregoing ranges.

In some examples, the catalyst particles may have a diameter in the range of 0.01 mm to 5 mm. In some examples, the catalyst particles have a diameter of 0.5 mm to 5 mm. In some examples, the catalyst bed is a fixed bed catalyst wherein the catalyst particles have a diameter of 0.5 mm to 5 mm. In some examples, the catalyst bed is a fluid bed catalyst wherein the catalyst particles have a diameter of 0.01 mm to 0.5 mm.

The bio-oil comprises crude fuel-range organic oxygen-containing compounds which may be fractionated (e.g., by distillation) into fractions having certain boiling point ranges. The fractions of the bio-oil include transportation fuels, such as renewable aviation fuel, renewable diesel fuel, and renewable gasoline, that boil in the range of 40° C. to 300° C. In particular, processing the lipid feedstock with a catalyst having properties described above produces a bio-oil having improved yields of aviation fuel, diesel fuel, and gasoline.

The bio-oil produced from the foregoing treatment process can be further characterized as having a lower content of oxygen and impurities as compared to the lipid feedstock.

The bio-oil may have a TAN of less than 5 mg KOH/g (e.g., less than 4 mg KOH/g, less than 3 mg KOH/g, less than 2 mg KOH/g, or less than 1 mg KOH/g).

The bio-oil may comprise less than 10 ppm (e.g., less than 5 ppm, less than 1 ppm, or less than 0.5 ppm) of chlorine, calculated as elemental chlorine (a Cl atom).

The bio-oil may comprise less than 1 ppm of alkali metals, alkaline earth metals, metals of the Groups VIIB and VIIIB of the Periodic Table of Elements (other metals), or combinations thereof, calculated as elemental metals, in total, preferably less than 0.5 ppm.

The oxygen content of the bio-oil may be 5 wt. % or less (e.g., 3 wt. % or less, or 2 wt. % or less), on a dry basis, based on the total weight of the bio-oil. Oxygen content can be determined using ASTM D5291. Lipid feedstocks can have an oxygen content in a range of about 10 to 15 wt. %, on a dry basis, based on the total weight of the feedstock.

Hydroprocessing

Beneficially, the bio-oil produced by the process disclosed herein may be used directly as a refinery feedstock for further processing in a refinery.

The obtained bio-oil may be blended with one or more mineral oil feedstocks originating from crude oil, shale oil or coal and likewise used as a refinery feedstock.

If desired, the bio-oil may be subjected to a catalytic hydroprocessing step. The obtained at least one effluent (hydroprocessing product) may be fractionated in a fractionating step to provide hydrocarbon fractions, suitable as renewable fuels or fuel components, useful as transportation fuels, fuel components and other chemicals.

The catalytic hydroprocessing step may be carried out in one step or in more than one steps.

The catalytic hydroprocessing step may be carried out by processing one or more fractions (such as distillation cuts) of the bio-oil separately or the bio-oil may be processed as a whole.

The catalytic hydroprocessing may comprise at least a hydrodeoxygenation step. Catalytic hydroprocessing may comprise a hydrodeoxygenation step followed by one or more steps selected from hydroisomerization and hydrocracking steps.

Hydroprocessing may be performed using one or more hydroprocessing catalysts comprising one or more metals selected from Group VIA and Group VIII metals. Particularly useful examples are Mo, W, Co, Ni, Pt and Pd. The catalyst(s) can also contain one or more support materials, for example zeolite, alumina, alumina-silica, zirconia, alumina-silica-zeolite and activated carbon. Suitably a mixture of CoO and $MOO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on alumina may be used.

Hydroprocessing conditions can include a temperature of from 100° C. to 450° C. (e.g., 200° C. to 370° C., or 230° C. to 350° C.); a pressure of from 72 to 4,350 psi (0.5 to 30 MPa) (e.g., 435 to 3,620 psi (3 to 25 MPa), or 435 to 1,740 psi (3 to 12 MPa)); a liquid hourly space velocity of from 0.01 to 10 $h^{-1}$ (e.g., 0.1 to 5 $h^{-1}$). The hydrogen gas treat rate can be in a range of from 600 to 4000 $Nm^3/m^3$ (e.g., 1300 to 2200 $Nm^3/m^3$).

The hydroprocessing occurs in a reaction stage. The reaction stage can comprise one or more reactors or reaction zones each of which comprises one or more catalyst beds of the same or different catalyst. Types of catalyst beds can include one or more of fixed beds, fluidized beds, ebullating beds, slurry beds, and moving beds. Interstage cooling or heating between reactors, reaction zones, or between catalyst beds in the same reactor, can be employed.

At least one effluent from the hydroprocessing is drawn off from the last reactor. In one embodiment, the effluent is directed to a separator, such as any suitable separator or flashing unit. In the separator, typically water, gaseous stream comprising hydrogen, light hydrocarbons (e.g., C1-C5 hydrocarbons), $H_2S$, CO and $CO_2$ are separated from the liquid component comprising >C5 hydrocarbons and some C1-C5 hydrocarbons. Water and gases may also be separated by other means which are well known to those skilled in the art.

The liquid hydrocarbon stream obtained from the hydroprocessing step includes fuel grade hydrocarbons having a boiling point of at most 380° C., according to ISO EN 3405. The person skilled in the art is able to vary the distilling conditions and to change the temperature cut point as desired to obtain any suitable hydrocarbon product, boiling suitably in the transportation fuel ranges. In particular, the lipid feedstock treatment described above and further below produces an improved yield of transportation fuels, such as renewable aviation fuel, renewable diesel fuel, and renewable gasoline, that boil in the range of 40° C. to 300° C.

EXAMPLES

The following illustrative examples are intended to be non-limiting.

Catalyst Properties

Without being bound by a particular theory, a surprising improvement has been identified wherein the size of the catalyst particles used in the treatment of the lipid feedstock to produce the bio-oil improves the yield of transportation fuels that boil in the range of 40° C. to 300° C. In particular, improved yield of desired transportation fuels was accomplished using catalyst particles having a diameter in the range of 0.01 to 0.5 mm, more preferably in the range of 0.10 to 0.50 mm, and yet more preferably in the range of 0.1 to 0.2 mm.

Table 1 below provides data illustrating the improvement. A lipid feedstock derived from soybean oil was treated in a reactor having a catalyst bed, wherein the reactor was operated at a pressure of 100 psig, a temperature of 900° F., and an LHSV of 1.06 for the lipid feedstock. As the data in the table below indicates, in Test 1, calcium promoted alumina catalyst particles in the reactor's catalyst bed had a diameter of 0.1 to 0.2 mm. Test 2 was performed under the same conditions, but with calcium promoted alumina catalyst particles in the reactor's catalyst bed having a diameter of 3 mm. Boiling point ranges are listed on the left side of Table 1. The data demonstrates that the smaller catalyst particles of Test 1 provided a substantial improvement in the production of transportation fuels that boil in the range of 40° C. to 300° C. when compared to the data from Test 2 with a catalyst particle size of 3 mm.

TABLE 1

| | Test 1 | Test 2 |
|---|---|---|
| Catalyst particle size | 0.1-0.2 mm | 3 mm |
| | Wt % | Wt % |
| <20 C. | 2.08 | 2.3 |
| 20-75 C. | 8.95 | 7.7 |
| 75-152 C. | 19.65 | 16.2 |
| 152-200 C. | 13.97 | 11.7 |
| 200-300 C. (Jet A) | 33.36 | 28.1 |
| 300-360 C. | 13.00 | 15.5 |
| 360 C.-420 C. | 7.56 | 12.9 |
| >420 C. | 1.42 | 5.6 |

The data shows an increase of 21 wt % for the fraction having a boiling range of 75 to 152° C., an increase of 19 wt % for the fraction having a boiling range of 152 to 200° C., and an increase of 19 wt % for the fraction having a boiling range of 200 to 300° C.

The data of Table 1 also is illustrated in the graph of FIG. 1. Additionally, the graph of FIG. 1 provides further comparative data for Test 3 performed on catalyst particles having a diameter of 0.1 to 0.2 mm. Test 3 was performed under the same reactor conditions, except that the LHSV was increased to 1.37. Interestingly, the wt % of the fractions produced in Test 3 was nearly identical to the wt % of the fractions produced in Test 1. The data of Test 3 indicates that the volume of catalyst is not the primary factor driving the improved yields of transportation fuels, but instead, it is the size of the catalyst particles that is the primary factor driving the improved yields of transportation fuels.

The data of Table 1 and FIG. 1 was obtained by standard gas chromatographic methods.

The Reactor System And Process

As described above, in order to provide renewable feedstocks of bio-oils suitable for refinery operations, the lipid feedstock is treated with a metal oxide catalyst to produce a treated stream. The treated stream comprises a condensable oil fraction that can be condensed and fractionated into a gas fraction and a liquid fraction, wherein the liquid fraction comprises water and a bio-oil suitable for use as a renewable feedstock for hydroprocessing.

FIG. 2 illustrates one example reactor system in accordance with embodiments of the present disclosure. It should be understood that the example embodiments described herein can be applied to other types of reactor systems as well.

FIG. 2 illustrates certain components associated with a reactor system 100. Reactor system 100 can be used to treat a lipid feedstock and produce a bio-oil renewable feedstock with the improved yields of transportation fuels that boil in the range of 40° C. to 300° C. The bio-oil is suitable for processing in a refinery for the ultimate production of transportation fuels. The reactor 102 comprises a top portion 103, a bottom portion 104, and at least one catalyst zone 105. The catalyst zone 105 comprises metal oxide catalyst particles that form a catalyst bed 106. The metal oxide catalyst particles can be one of the example metal oxide catalysts described previously. In particular, the catalyst bed can comprise calcium-promoted alumina catalyst particles having a diameter in the range of 0.01 to 0.5 mm, more preferably in the range of 0.10 to 0.50 mm, and yet more preferably in the range of 0.1 to 0.2 mm. More specifically, the catalyst comprising calcium oxide on an alumina support can have catalyst particles with one of the foregoing diameters and comprising 0.1 to 10 wt % of calcium. In certain embodiments, the reaction that the lipid feedstock undergoes in the catalyst zone 105 may be described as a ketopyrolysis reaction, wherein the lipid feedstock undergoes both ketonization and pyrolysis.

As further illustrated in FIG. 2, the reactor 102 comprises a lipid feedstock inlet 114 at which a lipid feedstock 112 flows into the reactor 102 during a reaction mode. In certain examples, a distributor tray within the reactor 102 may distribute the lipid feedstock 112 across the reactor 102. In the example of FIG. 2, the lipid feedstock 112 flows downward through the reactor 102 and is treated by the catalyst bed 106 producing a treated stream 120 that exits the reactor 102 through an outlet at the bottom portion 104 of the reactor 102. However, in other embodiments, the reactor may be configured for lipid feedstock to enter at the bottom portion of the reactor and flow upward through a catalyst bed. When the treated stream exits the reactor 102, a separator 135 can separate the treated stream into a gaseous component from a liquid component, wherein the liquid component comprises the bio-oil. The bio-oil can then be fractioned into distillate fractions, such as jet fuel, diesel fuel, and gasoline.

Also located at the bottom portion 104 of the reactor 102 is an air inlet 132 through which air 130 may flow into the reactor 102. The air flow can be used for operating the reactor in a regeneration mode. When the reactor is operating in a regeneration mode, combustion occurs generating a flue gas. The flue gas flows upward through the reactor 102 and exits through a flue gas outlet. In certain example embodiments, the reactor 102 can operate alternately in a reaction mode and in a regeneration mode and the operation of the modes can be governed by control system 130.

In addition to controlling the operating modes of the reactor, the control system 130 can include a temperature controller and a pressure controller for managing temperature and pressure conditions within the reactor. As illustrative ranges, during the reaction mode, the control system 130 may maintain conditions within the reactor whereby a reaction mode temperature within the reactor is in a range of from 450° C. to 550° C. and a reaction mode pressure within the reactor is in a range from 30 psi to 1,450 psi. In a more specific embodiment, the control system 130 may maintain the reaction mode pressure within the reactor in a range of 100 psi to 500 psi. Reaction mode pressure refers to the pressure at the top portion 103 of the reactor 102 proximate the lipid feedstock inlet 114. Those of skill in this field will understand that the pressure within the reactor will drop as the lipid feedstock flows downward through the catalyst bed 106. Operating the reactor system 102 in the reaction mode in a downflow direction within the specified pressure ranges can assist in reducing plugging and channeling within the catalyst bed.

Over time, the reaction occurring in the catalyst zone 105 causes coke and impurities to build up on the metal oxide catalyst. The coke and impurities should be periodically removed from the metal oxide catalyst in order for the reactor to operate properly. Accordingly, during certain times, the control system 130 switches the reactor 102 from the reaction mode to the regeneration mode. The regeneration mode can be used to burn away coke and remove impurities from the catalyst bed.

As illustrative ranges, during the regeneration mode, the control system 130 may maintain conditions within the reactor whereby a regeneration mode temperature within the reactor is in a range of from 400° C. to 800° C. to facilitate combustion within the reactor. The control system 130 may maintain a regeneration mode pressure within the reactor that is lower than the reaction mode pressure. A lower pressure during the regeneration mode can facilitate expansion of the catalyst bed 106 and removal of particles of impurities from the catalyst bed 106. As an illustrative range, the control system 130 can maintain a regeneration pressure in the reactor 102 from 10 psi to 70 psi, more specifically from 10 psi to 50 psi. Regeneration mode pressure refers to the pressure at the bottom portion 104 of the reactor 102 proximate the air inlet 132. Those of skill in this field will understand that the pressure within the reactor will drop as the air and flue gas flows upward through the catalyst bed 106.

Referring now to FIG. 3, an example process is provided. FIG. 3 illustrates a process 300 by which the example reactor system 100 of FIG. 2 operates. However, the operations of example process 300 are illustrative examples and in other embodiments the operations of process 300 can be modified.

Referring to operation 305 of process 300, the lipid feedstock 112 is provided to the reactor 102. As explained previously, the lipid feedstock can be from a renewable source. In operation 310, the lipid feedstock 112 flows through the catalyst zone 105 where it is treated by the metal oxide catalyst. The metal oxide catalyst particles can be one of the example metal oxide catalysts described previously. In particular, the catalyst bed can comprise calcium-promoted alumina catalyst particles having a diameter in the range of 0.01 to 0.5 mm, more preferably in the range of 0.10 to 0.50 mm, and yet more preferably in the range of 0.1 to 0.2 mm. More specifically, the catalyst comprising calcium oxide on an alumina support can have catalyst particles with one of the foregoing diameters and comprising 0.1 to 10 wt % of calcium.

The treating conditions within the reactor 102 can include maintaining a pressure within the reactor in a range of 30 psi to 1,450 psi, which can be referred to as the reaction mode pressure. Preferably, the reaction mode pressure within the reactor is maintained within the range of 100 psi to 500 psi, and more preferably within the range of 100 psi to 200 psi. The treating conditions within the reactor can further include maintaining a temperature in the range of 400° C. to 600° C., and more preferably in the range of 450° C. to 550° C. Treating the lipid feedstock 112 with the metal oxide catalyst produces a treated stream.

The treated stream exits through an outlet at the bottom portion 104 of the reactor 102. In operation 315, a separator can separate the non-condensable components of the treated stream from the liquid fraction comprising a bio-oil renewable feedstock. In operation 320, the bio-oil can be fractionated into crude fuel-range components, such as jet fuel, diesel fuel, and gasoline. In certain embodiments, the bio-oil can undergo hydroprocessing before being fractionated into fuel-range components.

For any figure shown and described herein, one or more of the components may be omitted, added, repeated, and/or substituted. Additionally, it should be understood that in certain cases components of the example systems can be combined or can be separated into subcomponents. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

With respect to the example methods described herein, it should be understood that in alternate embodiments, certain steps of the methods may be performed in a different order, may be performed in parallel, or may be omitted. Moreover, in alternate embodiments additional steps may be added to the example methods described herein. Accordingly, the example methods provided herein should be viewed as illustrative and not limiting of the disclosure.

Terms such as "first", "second", "top", "bottom", "side", "distal", "proximal", and "within" are used merely to distinguish one component (or part of a component or state of a component) from another. Such terms are not meant to denote a preference or a particular orientation unless so indicated by the context, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The terms "a", "an", and "the" are intended to include plural alternatives, e.g., at least one. The terms "including", "with", and "having", as used herein, are defined as comprising (i.e., open language), unless specified otherwise.

When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Numerical end points of ranges disclosed herein are approximate, unless excluded by proviso.

Values, ranges, or features may be expressed herein as "about", from "about" one particular value, and/or to "about" another particular value. When such values, or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±20% of the stated value, ±15% of the stated value, ±10% of the stated value, ±5% of the stated value, ±3% of the stated value, or ±1% of the stated value.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method of processing a lipid feedstock, the method comprising:

feeding a lipid feedstock to a reactor comprising at least one bed of catalyst particles, wherein the catalyst particles comprise a metal oxide on an oxide support and promote combined ketonization and pyrolysis of the lipid feedstock to produce a treated stream; and fractionating the treated stream to obtain a gaseous fraction and a liquid fraction, the liquid fraction comprising a bio-oil having a lower content of oxygen and impurities than the lipid feedstock, wherein the catalyst particles have a diameter of 0.01 mm to 5 mm.

2. The method of claim 1, wherein the catalyst particles have a diameter of 0.5 mm to 5 mm.

3. The method of claim 1, wherein the metal of the metal oxide is selected from Na, K, Cs, Ba, Mg, Ca, Sr, Cr, Mo, Mn, Fe, Co, Ni, Cu, Zn, Al, Y, Zr, Ti, Ce, and La, or a mixture thereof.

4. The method of claim 3, wherein the metal of the metal oxide is selected from:

Na, K, and Cs;

Ba, Mg, Ca, and Sr; and

Ce and La.

5. The method of claim 3, wherein the metal of the metal oxide is selected from:

a mixture of K and Ca;

a mixture of Ca and Mg;

a mixture of Ce and Mg;

a mixture of Ca and La;

a mixture of K and Ce;

a mixture of Ca and Ce;

a mixture of Mg, Ca, and Ce; and a mixture of K, Ca, and Ce.

6. The method of claim 1, wherein the oxide support is selected from silica-alumina, zeolite, alumina, magnesium oxide, zirconia, and titanium oxide.

7. The method of claim 6, wherein the oxide support is alumina.

8. The method of claim 1, wherein a jet fuel A fraction comprises 30 to 34 wt % of the bio-oil.

9. The method of claim 1, wherein a fraction having a boiling point range of 75 to 200° C. comprises 32 to 35 wt % of the bio-oil.

10. The method of claim 1, further comprising subjecting the bio-oil to a catalytic hydroprocessing step to provide a hydroprocessed product.

11. The method of claim 1, wherein the bio-oil has an oxygen content of 10% to 40% of the oxygen content of the lipid feedstock.

12. A reactor system for processing a lipid feedstock, the reactor system comprising:

a reactor containing at least one bed of catalyst particles, wherein the catalyst particles comprise a metal oxide on an oxide support and promote combined ketonization and pyrolysis of the lipid feedstock to produce a treated stream;

a lipid feedstock inlet for feeding the lipid feedstock to the reactor; and a separator for receiving the treated stream from the reactor and fractionating the treated stream to obtain a gaseous fraction and a liquid fraction, the liquid fraction comprising a bio-oil having a lower content of oxygen and impurities than the lipid feedstock, wherein the catalyst particles have a diameter of 0.01 mm to 5 mm.

13. The reactor system of claim 12, wherein the catalyst particles have a diameter of 0.5 mm to 5 mm.

14. The reactor system of claim 12, wherein the metal of the metal oxide is selected from Na, K, Cs, Ba, Mg, Ca, Sr, Cr, Mo, Mn, Fe, Co, Ni, Cu, Zn, Al, Y, Zr, Ti, Ce, and La, or a mixture thereof.

15. The reactor system of claim 14, wherein the metal of the metal oxide is selected from:

Na, K, and Cs;

Ba, Mg, Ca, and Sr; and

Ce and La.

16. The reactor system of claim 14, wherein the metal of the metal oxide is selected from:

a mixture of K and Ca;

a mixture of Ca and Mg;

a mixture of Ce and Mg;

a mixture of Ca and La;

a mixture of K and Ce;

a mixture of Ca and Ce;

a mixture of Mg, Ca, and Ce; and a mixture of K, Ca, and Ce.

17. The reactor system of claim 12, wherein the oxide support is selected from silica-alumina, zeolite, alumina, magnesium oxide, zirconia oxide, and titanium oxide.

18. The reactor system of claim 17, wherein the oxide support is alumina.

* * * * *